J. N. DISSELKOEN.
TIRE GUARD FOR WHEELS.
APPLICATION FILED JULY 7, 1919.
1,321,992.
Patented Nov. 18, 1919.
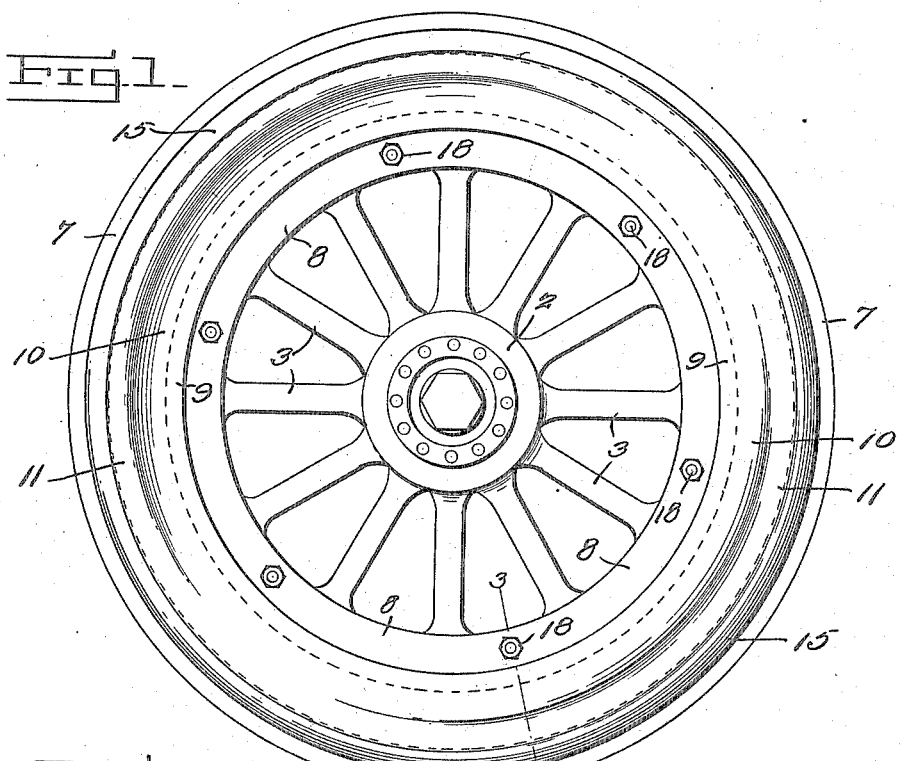
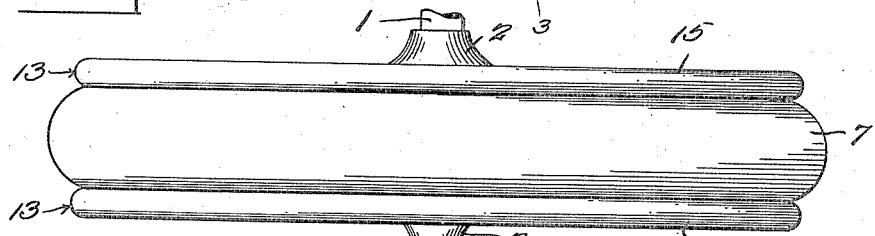
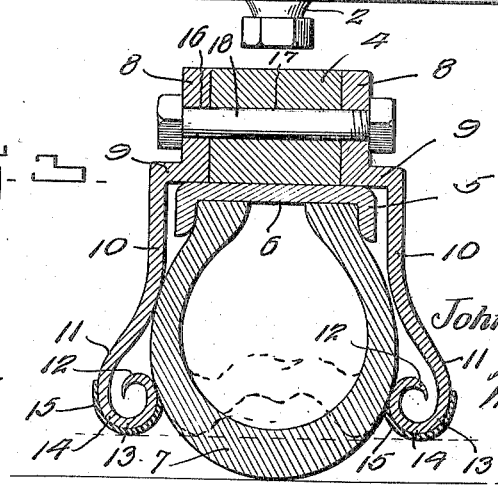
Witness
Inventor
John N. Disselkoen
Attorney

UNITED STATES PATENT OFFICE.

JOHN N. DISSELKOEN, OF DUVAL, FLORIDA.

TIRE-GUARD FOR WHEELS.

1,321,992.  Specification of Letters Patent.  Patented Nov. 18, 1919.

Application filed July 7, 1919. Serial No. 309,154.

*To all whom it may concern:*

Be it known that I, JOHN NICOLASS DISSELKOEN, a citizen of the United States of America, and a resident of the county of Duval, in the State of Florida, (whose post-office address is Number 312 East Twenty-second street, Jacksonville, Florida,) have invented a new and useful Improvement in Tire-Guards for Wheels, of which the following is a specification.

The main object of my invention is to provide an improved guard, of the collar type, for the tires of wheels, to protect the tires from injury by contact therewith of outside objects as well as a protection for the rim of the wheel, in the case of the flattening of the tire or deflation of the tire where a pneumatic tire is employed, by assuming the duty of the tire when punctured or blown out.

Another object of this invention is to provide an improved tire-guard which will enable the cushioning tire of a wheel to be dispensed with when desired and enable the wheel to run comfortably without a tire on smooth or good hard roads.

My invention consists of a tire guard comprising two metal collars each collar being of improved construction having its body slightly curved outwardly near its outer edge, which edge is rolled up and coiled into a circular beaded tread in such a way that the edge projects inwardly and resiliency is provided; the collars being attached one on each side of the tire in such a way that they will project as far as possible beyond the rim of the wheel without interfering with the working resiliency of the tread of the tire while the circular beaded treads are adapted to bear against the sides of the tire as hereinafter described and claimed.

In order that my invention may be fully understood I will proceed to describe it with reference to the accompanying drawings, in which:

Figure 1 is a side elevation of a wheel showing my improved tire guard.

Fig. 2 is a top or plan view thereof.

Fig. 3 is an enlarged radial section on the line 3—3 of Fig. 1 showing a hollow tire in full lines and flattened or deflated in dotted lines.

1 is an axle on which the wheel is mounted. The wheel is shown as having a hub 2, spokes 3, a felly 4, a rim 5, projecting outside of the felly 4, a tire channel 6 within the rim 5 and a tire 7. All these parts may be of ordinary construction. In the present instance I have shown a pneumatic tire though any preferred form of yielding or cushioning tire either hollow or solid may be employed.

Referring now to my improved tire-guard. This tire-guard consists of a pair of collars: each collar being formed with a flat inner ring 8, fitting against a side of the felly 4 in the angle formed at the juncture between the felly 4 and the inner side of the projecting rim 5 of the wheel, having an offset intermediate annular rim 9 projecting outwardly beyond the rim 5 of the wheel from which extends the outer guard ring 10 contiguous to the body of the tire and having a slightly outwardly curved or concave part 11 formed with an inwardly projecting edge 12, rolled up and coiled into a resilient circular or convolute bead 13 providing a yielding or cushioning tread 14 in the absence of the tire. As shown in the drawing the pair of collars provides a flexible closely fitting tire pocket from which the tread of the tire normally projects to sustain the wheel and its load. Each of the treads 14 of the rolled up circular or convolute beads 13 have a covering 15 of rubber or similar material providing silencers for the collar treads. The flat inner ring 8 of each of the collars is provided with an annular series of bolt holes 16, registering with a series of bolt holes 17 in the felly 4 of the wheel.

The bolt holes 16 in the inner ring 8, and the bolt holes 17 in the felly 4 receive bolts 18 whereby the collars are detachably secured to the felly 4 of the wheel.

The collars are made of steel or other suitable metal. In the case of tire changing, only the outside collar is removed.

My tire guard provides the advantage of a substitute for a tire in an emergency while the rolled up and coiled beads bear yieldingly against the sides of the tire when the latter is in normal position thus forming a firm but cushioning support. The coiled parts of the beads form inner strengthening arches to the rolled up beads.

My tire guard will absolutely prevent the so dreaded rim cutting, for the reason that the wheel will run on the treads of the rolled up and coiled beads of the tire-guard in case of flat or deflated tire and the tire is, when revolving, lightly compressed in the curved spaces in the collars. It will also be observed in the present construction there are no free edges or flanges on the collars forming channels adapted to gather material from the sides of ruts in the roadways on which the wheels are caused to travel. The tire-guard will also prevent the so often fatal scraping of the tire against the curbstones or any other object the tire may be driven against. No matter how far away from home or garage, puncture nor blowout need not be dreaded, as a return on the tire-guards, is hardly noticeable while the tire, tube and rim are one and all safely guarded. It is therefore never necessary to change tires on the road when my tire-guards are used.

Having thus described my invention the following is what I claim as new therein and desire to secure by Letters Patent:

1. A tire-guard constructed with a collar having an inwardly projecting rolled up and coiled edge, providing a circular or convolute bead.

2. A tire-guard constructed with an inner ring, an intermediate rim and an outer ring having an inwardly projecting rolled up and coiled edge, providing a circular or convolute bead.

3. A tire-guard comprising a pair of collars each constructed with an inner ring, an intermediate rim and an outer ring having an inwardly projecting rolled up and coiled edge, providing each collar with a circular or convolute bead.

JOHN N. DISSELKOEN.